(12) United States Patent
Hong et al.

(10) Patent No.: US 7,720,371 B2
(45) Date of Patent: May 18, 2010

(54) DEPTH LAYER EXTRACTION AND IMAGE SYNTHESIS FROM FOCUS VARIED MULTIPLE IMAGES

(75) Inventors: Li Hong, San Diego, CA (US); Mark Takita, Menlo Park, CA (US); W. Thomas Novak, Hillsborough, CA (US)

(73) Assignee: Nikon Corporation, Tokyo (JP)

( * ) Notice: Subject to any disclaimer, the term of this patent is extended or adjusted under 35 U.S.C. 154(b) by 530 days.

(21) Appl. No.: 11/655,501

(22) Filed: Jan. 18, 2007

(65) Prior Publication Data

US 2008/0175576 A1 Jul. 24, 2008

(51) Int. Cl.
G03B 3/10 (2006.01)
G03B 13/34 (2006.01)
H04N 5/232 (2006.01)

(52) U.S. Cl. .................. 396/121; 396/122; 348/348

(58) Field of Classification Search .............. 396/89, 396/121, 122, 150; 348/345, 349, 350, 348
See application file for complete search history.

(56) References Cited

U.S. PATENT DOCUMENTS

| | | | |
|---|---|---|---|
| 5,438,363 A | 8/1995 | Ejima et al. | |
| 5,877,809 A | 3/1999 | Omata et al. | |
| 7,046,290 B2 | 5/2006 | Nozaki | |
| 2001/0002216 A1* | 5/2001 | Chuang et al. | 382/255 |
| 2003/0011700 A1* | 1/2003 | Bean et al. | 348/345 |
| 2004/0041941 A1 | 3/2004 | Takeshita | |
| 2005/0195290 A1 | 9/2005 | Takeshita | |
| 2005/0264685 A1 | 12/2005 | Hoshuyama | |

FOREIGN PATENT DOCUMENTS

| | | |
|---|---|---|
| JP | 2003-092699 | 3/2003 |
| JP | 2004-282460 | 10/2004 |

OTHER PUBLICATIONS

The Nikon Guide to Digital Photography with the D2x Digital Camera by Nikon Corporation. The D2x digital camera was released on Feb. 25, 2005.

(Continued)

*Primary Examiner*—Rochelle-Ann J Blackman
(74) *Attorney, Agent, or Firm*—Roeder & Broder LLP

(57) ABSTRACT

A camera (210) for providing an adjusted image (214) of a scene (12) includes an apparatus frame (224), an optical assembly (222), a capturing system (226), and a control system (232). The optical assembly (222) is adjustable to alternatively be focused on a first focal area (356A) and a second focal area (356B) that is different than the first focal area (356A). The capturing system (226) captures a first captured image (360A) when the optical assembly (222) is focused at the first focal area (356A) and captures a second captured image (360B) when the optical assembly (222) is focused at the second focal area (356B). The control system (232) provides the adjusted image (214) of the scene (12) based upon the first captured image (360A) and the second captured image (360B). Additionally, the control system (232) can perform object depth extraction of one or more objects (16) (18) (20) in the scene (12). Alternatively, the multiple captured images (360A) (360B) can be adjusted by a separate adjustment system (680).

27 Claims, 12 Drawing Sheets

OTHER PUBLICATIONS

Proceedings of the 2004 IEEE Computer Society Conference on Computer Vision and Pattern Recognition (CVPR'04) 1063-6919/04.
Model No. GM 5WA06200Z by Sharp—Built-in 3-chip, Super-luminosity Chip LED, as of Apr. 2001.
http://optics.org/aticles/news/10/10/14/1 Dated Dec. 10, 2004, Lamina Ceramics LED array.
Luxeon Flash LXCL-PWF1—Technical Datasheet DS49. Dated Nov. 12, 2004, Lumileds Future Electronics.

* cited by examiner

DEPTH LAYER EXTRACTION AND IMAGE SYNTHESIS FROM FOCUS VARIED MULTIPLE IMAGES

BACKGROUND

Cameras are commonly used to capture an image of a scene. Some scenes often contain multiple objects which are located at different distances from the camera. For example, a scene may include one or more primary object(s) that are the primary focal point, and one or more objects that are in the foreground or the background. Unfortunately, most inexpensive point and shoot cameras use a relatively inexpensive lens. As a result thereof, for a typical captured image all of the objects in the captured image have approximately the same level of resolution even though the objects are at different distances from the camera.

SUMMARY

The present invention is directed to a camera for providing an adjusted image of a scene. The camera includes an optical assembly, a capturing system coupled to the optical assembly, and a control system secured to the apparatus frame. The optical assembly is adjustable to alternatively be focused on a first focal area and a second focal area that is different than the first focal area. The capturing system captures a first captured image when the optical assembly is focused at the first focal area and captures a second captured image when the optical assembly is focused at the second focal area. In one embodiment, the control system provides the adjusted image of the scene based upon the first captured image and the second captured image.

With this design, each of the captured images has a different focal area and the captured images can be captured in rapid succession. In certain embodiments, the scene includes a primary object and a secondary object and the control system evaluates the captured images to determine a depth order of the objects in the scene relative to the camera.

In one embodiment, the depth order of the captured images can be used to guide the synthesis of the adjusted image. For example, during the creation of the adjusted image, artificial blurring can be added to the secondary objects that are farther or closer than the primary object. As a result thereof, the primary object can be emphasized in the adjusted image.

In one embodiment, the optical assembly is adjustable to focus at a third focal area that is different than the first focal area and the second focal area. Further, the capturing system captures a third captured image when the optical assembly is at the third focal area. In this embodiment, the control system provides the adjusted image of the scene based upon the first captured image, the second captured image, and the third captured image.

The present invention is also directed to a combination for providing an adjusted image of a scene. The combination includes a camera and an adjustment system. The camera includes (i) an optical assembly; and (ii) a capturing system that captures a first captured image when the optical assembly is focused at a first focal area and captures a second captured image when the optical assembly is focused at a second focal area.

In this embodiment, the adjustment system receives the first captured image and the second captured image and provides the adjusted image of the scene based upon the first captured image and the second captured image.

The present invention is also directed to one or more methods for providing an adjusted image of the scene and one or more methods for determining the depth order of multiple objects in the scene.

BRIEF DESCRIPTION OF THE DRAWINGS

The novel features of this invention, as well as the invention itself, both as to its structure and its operation, will be best understood from the accompanying drawings, taken in conjunction with the accompanying description, in which similar reference characters refer to similar parts, and in which.

DESCRIPTION

Figure 1:
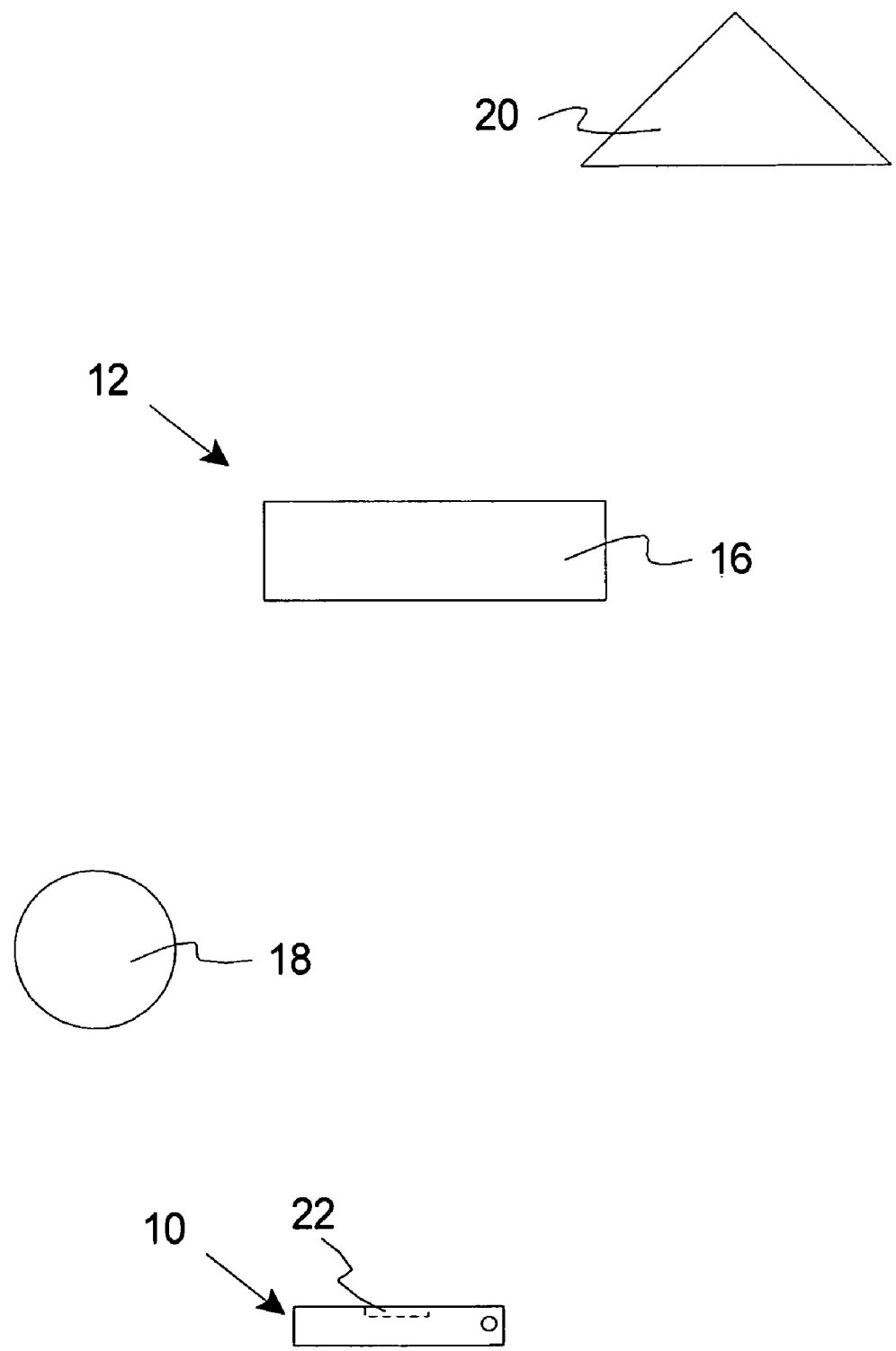
FIG. 1 is a simplified top plan view of a scene and a camera having features of the present invention.

FIG. 1 is a simplified top plan illustration of a camera 10 having features of the present invention and a scene 12. In one embodiment, the camera 10 is useful for providing an adjusted image 214 (illustrated in FIG. 2B) of the scene 12. The type of scene 12 captured by the camera 10 can vary. For example, the scene 12 can include one or more objects, e.g. people, animals, items, and/or environments. In certain embodiments, one or more of the objects are the primary objects being captured, one or more of the objects are positioned in the foreground and/or one or more of the objects are positioned in the background. In FIG. 1, the scene 12 includes a single first object 16 that is the primary object of the scene 12, and two secondary objects, namely a single second object 18 that is in the foreground, and a single third object 20 that is in the background. Alternatively, for example, the scene 12 may not include any foreground or background objects, and/or the scene 12 may include multiple primary objects, multiple foreground objects and/or multiple background objects.

In one embodiment, the camera 10 is a digital type camera that captures a digital image of the scene 12, and the camera 10 includes an optical assembly 22 (illustrated as a box in phantom) that can be adjusted to focus on or in-between one or more of the first object 16, the second object 18, and/or the third object 20. As described in greater detail below, in certain embodiments, the camera 10 captures multiple captured images (not shown in FIG. 1) of the same scene 12 at different adjustments of the optical assembly 22 in rapid succession. In certain embodiments, the multiple captured images can be analyzed to determine a depth order of objects 16, 18, 20 in the scene 12. With this information, the multiple captured images can be used to guide the synthesis of the adjusted image 214. For example, during the creation of the adjusted image 214, artificial blurring can be added to the secondary objects 18, 20 that are farther or closer than the primary object 16. As a result thereof, the primary object 16 can be emphasized in the adjusted image 214.

In one embodiment, the camera 10 is water resistant and able to capture images while under water. Alternatively, the camera 10 can be enclosed in a water resistant housing (not shown).

Figure 2A:
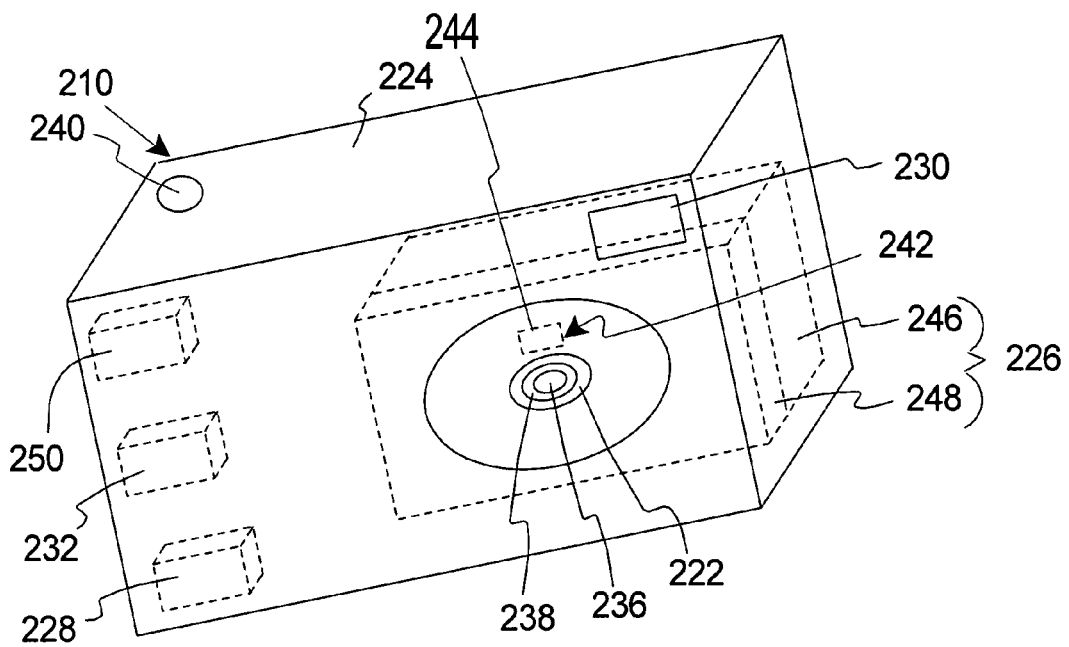
FIG. 2A is a simplified front perspective view of one embodiment of the camera.

FIG. 2A illustrates a simplified, front perspective view of one, non-exclusive embodiment of the camera 210. In this embodiment, the camera 210 includes an apparatus frame 224, the optical assembly 222, a capturing system 226 (illustrated as a box in phantom), a power source 228 (illustrated as a box in phantom), an illumination system 230, and a control system 232 (illustrated as a box in phantom). The design of these components can be varied to suit the design requirements and type of camera 210.

The apparatus frame 224 can be rigid and can support and/or enclose at least some of the other components of the camera 210. Additionally, the apparatus frame 224 can include an aperture 236 and a shutter mechanism 238 that work together to control the amount of light that reaches the capturing system 226. The shutter mechanism 238 can be activated by a shutter button 240. The shutter mechanism 238 can include a pair of blinds (sometimes referred to as "blades") that work in conjunction with each other to allow the light to be focused on the capturing system 226 for a certain amount of time. Alternatively, for example, the shutter mechanism 238 can be all electronic and contain no moving parts. For example, an electronic capturing system 226 can have a capture time controlled electronically to emulate the functionality of the blinds.

The optical assembly 222 is secured to the body of the camera 10 near the aperture 236. The optical assembly 222 can include a single lens or a combination of lenses that work in conjunction with each other to focus light onto the capturing system 226.

In one embodiment, the imaging capturing apparatus 210 includes an autofocus assembly 242 including one or more lens movers 244 that move one or more lenses of the optical assembly 222 in or out until the optical assembly 222 is focused on one of the objects 16, 18, 20. For example, the autofocus assembly 242 can be an active or passive type system.

The capturing system 226 captures each captured image, is positioned within the apparatus frame 224, and is coupled to the apparatus frame 224. The design of the capturing system 226 can vary according to the type of camera 10. For example, as illustrated in FIG. 2A, for a digital type camera, the capturing system 226 includes an image sensor 246, a filter assembly 248, and a storage system 250.

The image sensor 246 (illustrated as a box in phantom) receives the light that passes through the aperture 236 and converts the varying light patterns into electrical signals. The type of image sensor 246 can vary. One non-exclusive example of an image sensor 246 for digital cameras is known as a charge coupled device ("CCD"). An alternative image sensor 246 that may be employed in digital cameras uses complementary metal oxide semiconductor ("CMOS") technology.

The image sensor 246, by itself, produces a grayscale image as it only keeps track of the total intensity of the light that strikes the surface of the image sensor 246. Accordingly, in order to produce a full color image, the filter assembly 248 is necessary to capture the colors of the image.

It should be noted that other designs for the capturing system 226 can be utilized.

The storage system 250 stores the various captured images and/or the adjusted images 214 before the captured images and/or adjusted images 214 are ultimately printed out, deleted, combined, transferred or downloaded to another system (not shown in FIG. 2A), such as a computer, an auxiliary storage system or a printer. The storage system 250 can be fixedly or removably coupled to the apparatus frame 224. Non-exclusive examples of suitable storage systems 250 include flash memory, a floppy disk, a hard disk, or a writeable CD or DVD.

The power source 228 provides electrical power to the electrical components of the camera 210. For example, the power source 228 can include one or more batteries.

The illumination system 230 can provide a generated light beam (e.g. a flash of light), if needed, that can be used to illuminate at least a portion of the scene 12.

The control system 232 is electrically connected to and controls the operation of the electrical components of the camera 210. For example, the control system 232 is electrically connected to the optical assembly 222 and controls the operation of the optical assembly 222 to precisely control the focusing of the camera 210 for the capturing of the multiple captured images. The control system 232 can include one or more processors and circuits. In one embodiment, the control system 232 is coupled to the apparatus frame 224 and is positioned within the apparatus frame 224. The control system 232 is discussed in more detail below.

Figure 2B:
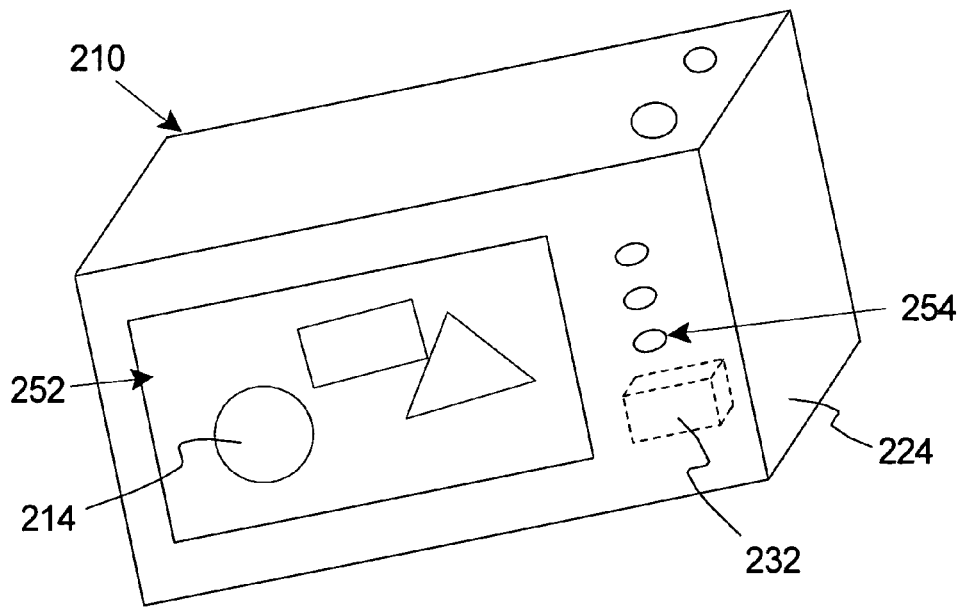
FIG. 2B is a simplified rear perspective view of the camera of FIG. 2A.

Referring to FIG. 2B, additionally, the camera 210 can include an image display 252 that displays the adjusted image 214 and/or one or more of the captured images (not shown in FIG. 2B). With this design, the user can decide which adjusted images 214 and/or captured images should be stored in the storage system 250 (illustrated in FIG. 2A) and which adjusted images 214 and/or captured images should be deleted. For example, the image display 252 can be fixedly mounted to the apparatus frame 224 on the back side. Alternatively, the image display 252 can be secured to the apparatus frame 224 with a hinge mounting system (not shown) that enables the display to be pivoted away from the apparatus frame 224. One non-exclusive example of an image display 252 includes an LCD screen.

Moreover, the camera 210 can include one or more control switches 254 electrically connected to the control system 232 that allow the user to control the functions of the camera 210. For example, the control switches 252 can be used to turn on and off the camera 210, delete the adjusted images 214 and/or captured images, focus the optical assembly 222 (illustrated in FIG. 2A), and many other functions. For example, one of the control switches 252 can be used to selectively activate and deactivate the capture of multiple captured images and the providing of the adjusted images 214.

Figure 3A:
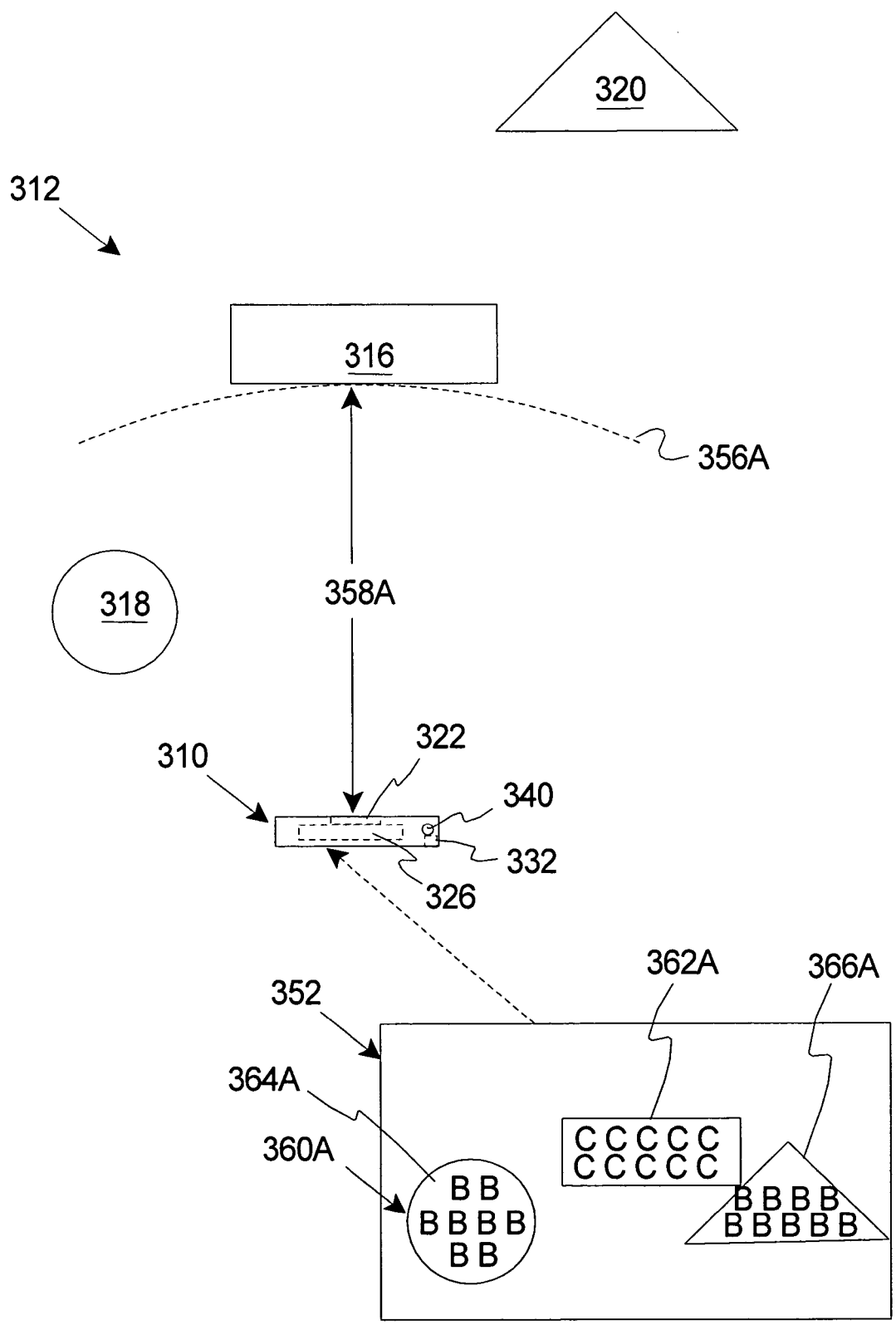
FIGS. 3A-3C illustrate the scene and the camera capturing three different captured images.
Figure 3B:
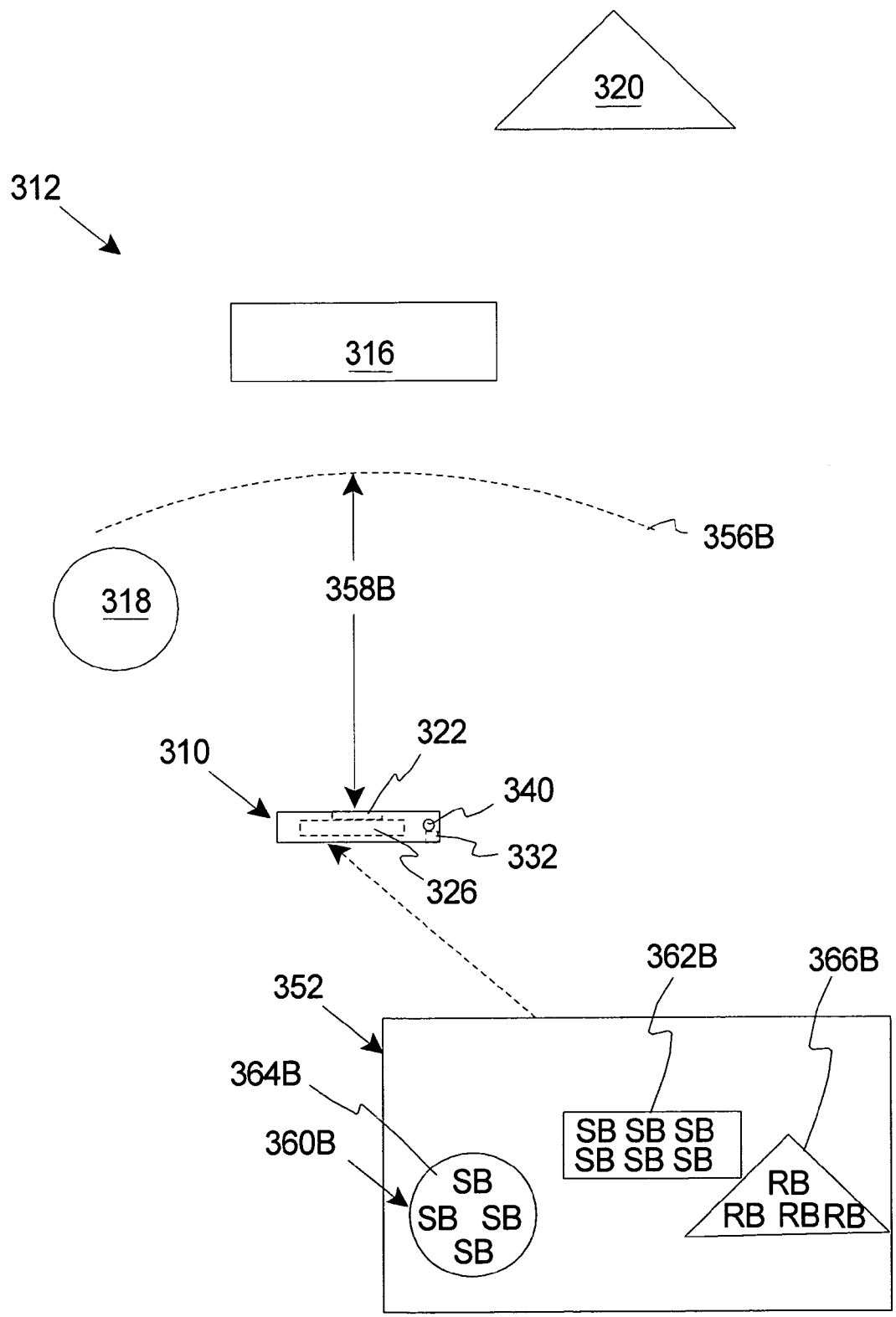
Figure 3C:
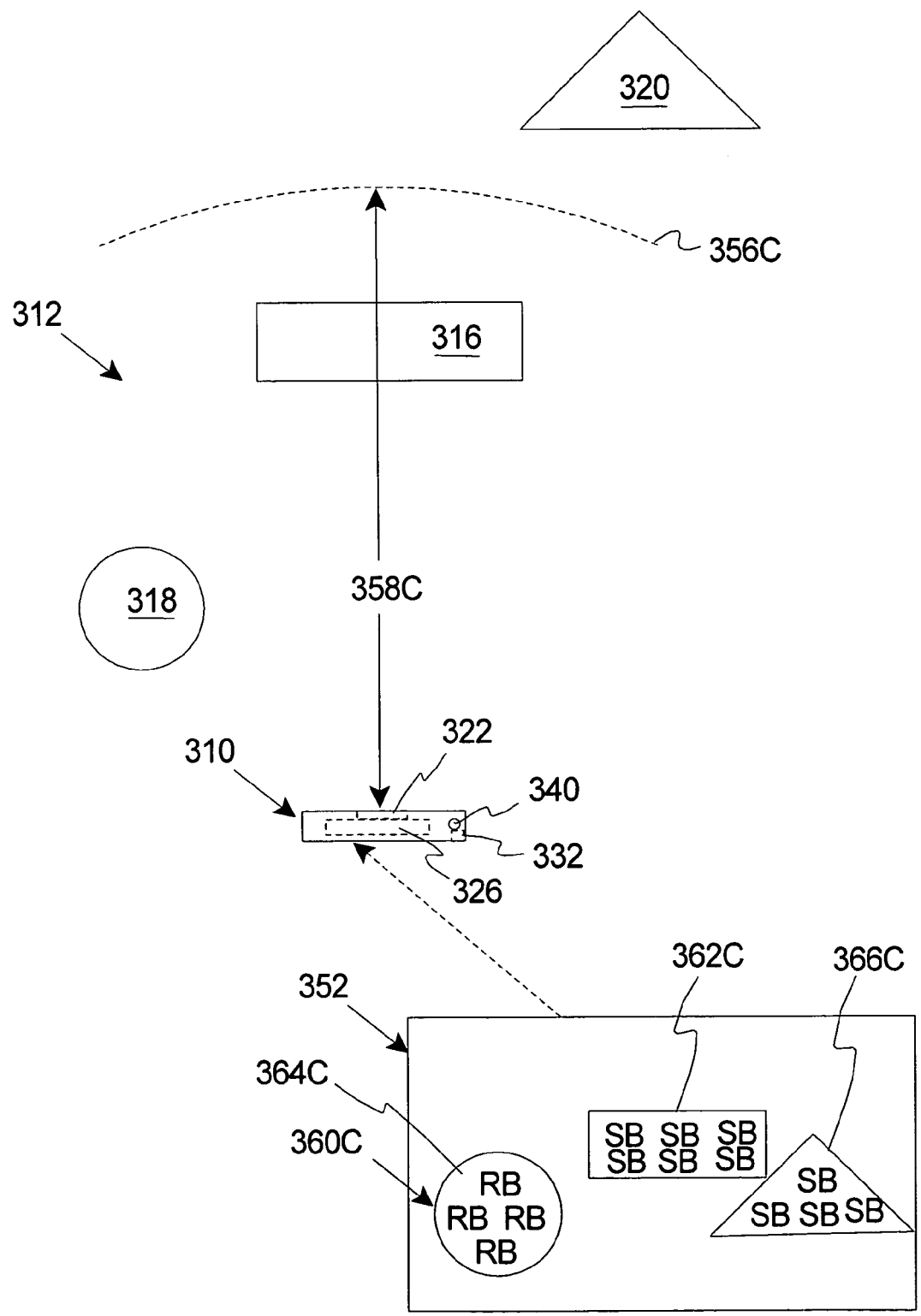

FIGS. 3A-3C illustrate the scene 312 including the first object 316, the second object 318, and the third object 320, the camera 310, and a set of captured images. In FIGS. 3A-3C, the first object 316 is a primary object of the scene 312 that is being captured, the second object 318 is a foreground object that is in the foreground, and the third object 320 is a background object that is in the background. In this scene 312, the second object 318 and the third object 320 can be referred to as secondary objects. Alternatively, for example, the first object 316 can be the object in the foreground or the background and/or the second object 318 or the third object 320 can be the primary object of the scene 312. FIGS. 3A-3C also illustrate the optical assembly 322, the capturing system 326, the control system 332, and the shutter button 340 of the camera 310. Additionally, FIGS. 3A-3C illustrate the image display 352 positioned away from the camera 310.

In FIG. 3A, the optical assembly 322 is adjusted to be focused approximately on the primary object 316. Stated in another fashion, in FIG. 3A, the optical assembly 322 is focused at a first focal area 356A (illustrated as a dashed area) that is approximately at the front of the primary object 316 and that is at a first focus distance 358A from the optical assembly 322 of the camera 310.

FIG. 3A also illustrates a first captured image 360A on the image display 352 that is captured while the optical assembly 322 is focused at the first focal area 356A near the first object 316. As a result thereof, for the first captured image 360A, a captured primary object image 362A is clearly captured and easily discernible (represented as "C's"), a captured foreground object image 364A is blurred (represented as "B's"), and a captured background object image 366A is also blurred (represented as "B's"). For a relatively inexpensive optical assembly 322, the difference in resolution between the captured object images 362A-362C may not be very much.

In FIG. 3B, the optical assembly 322 is adjusted to be focused on a second focal area 356B (illustrated as a dashed area) that is intermediate the primary object 316 and the foreground object 318, and that is at a second focus distance 358B from the camera 310. FIG. 3B also illustrates a second captured image 360B on the image display 352 that is captured while the optical assembly 322 is focused at the second focal area 356B. For the second captured image 360B, a captured primary object image 362B is slightly blurred (represented as "SB's"), a captured foreground object image 364B is also slightly blurred (represented as "SB's"), and a captured background object image 366B is really blurred (represented as "RB's").

In FIG. 3C, the optical assembly 322 is adjusted to be focused at a third focal area 356C (illustrated as a dashed area) that is intermediate the primary object 316 and the background object 320, and that is at a third focus distance 358C from the camera 310. FIG. 3C also illustrates a third captured image 360C on the image display 352 that is captured while the optical assembly 322 is focused at the third focal area 356C. For the third captured image 360C, a captured primary object image 362C is slightly blurred (represented as "SB's"), a captured foreground object image 364C is really blurred (represented as "RB's"), and a captured background object image 366C is only slightly blurred (represented as "SB's").

In FIGS. 3A-3C, the respective focal areas 356A, 356B, 356C are illustrated as being generally arc shaped. Alternatively, the respective focal area 356A, 356B, 356C can be generally planar shaped.

Referring to FIGS. 3A-3C, the focal areas 356A, 356B, 356C are at different focus distances 358A, 358B, 358C away from the optical assembly 322 of the camera 310. In this embodiment, the second focal area 356B is closest to the camera 310, the first focal area 356A is next closest to the camera 310, and the third focal area 356C is the farthest from the camera 310. Alternatively, for example, moving from closest to farthest, the focal areas 356A-356C could be organized (i) second, third, first; (ii) first, second, third; (iii) first, third, second; (iv) third, first, second; or (v) third, second, first. In certain embodiments, the control system 332 is able to determine the approximate values of the different focus distances 358A, 358B, 358C.

The amount of difference between the focus distances 358A, 358B, 358C can vary according to the design of the camera 310 and/or the positioning of the objects 316, 318, 320. In alternative, non-exclusive embodiments, the differences in the focus distances 358A, 358B, 358C can be approximately 1, 2, 5, 10, 15, 20, 30, 40, or 50 percent. Stated in another fashion, depending upon the scene, in alternative, non-exclusive embodiments, the differences in the focus distances 358A, 358B, 358C can be approximately 0.5, 1, 2, 3, 5, 10, 20, or 30 feet. However, other focus distances 358A, 358B, 358C can be utilized.

In one embodiment, the control system 332 controls the optical assembly 332 and the capturing system 326 to capture the three or more captured images 360A-360C in rapid succession. In one non-exclusive example, when the shutter button 340 is partly depressed, the control system 332 can controls the optical assembly 322 to focus the optical assembly 322 on the primary object 316 in FIG. 3A. Subsequently, when the shutter button 340 is completely depressed, the capturing system 326 captures the first captured image 360A. Next, the control system 332 (i) controls the optical assembly 322 to focus the optical assembly 322 at the second focal area 356B and the capturing system 326 captures the second captured image 360B, and (ii) controls the optical assembly 322 to focus the optical assembly 322 at the third focal area 356C and the capturing system 326 captures the third captured image 360C. With this design, the camera captures the first captured image 360B with the primary object 316 in focus and subsequently catches the second captured image 360B by focusing forward and the third captured image 360C by focusing backward.

Alternatively, for example, the control system 332 can control the optical assembly 322 to focus the optical assembly 322 and capture the captured images 360A-360C in another order. For example, the control system 332 can cause the captured images 360A-360C to be captured in the following orders (i) first, third, second; (ii) second, first, third; (iii) second, third, first; (iv) third, first, second; or (v) third, second, first.

Still alternatively, one or both of the second captured image 360B and the third captured image 360C can be captured prior to the capturing of the first captured image 360A and/or before fully depressing the shutter button 340. For example, one or both of the second captured image 360B and the third captured image 360C can be a thru-image. Further, the captured images 360A-360C can have different resolutions.

The amount of time in which the camera 310 captures the first, second and third captured images 360A-360C can vary. In one embodiment, the captured images 360A-360C are captured in rapid succession to reduce the influence of movement of the objects 316, 318, 320 on the captured images 360A-360C. For example, in non-exclusive embodiments, the camera 310 captures the multiple captured images 360A-360C in less than approximately 0.1, 0.2, 0.4, 0.6, 0.8, 1, 1.5 or 2 seconds.

While the current invention is disclosed as the control system 332 controlling the optical assembly 322 to adjust the focal areas 356A-356C, in certain embodiments, the optical assembly 322 can be manually adjusted to one or more of the focal areas 356A-356C. For example, the user can manually adjust the optical assembly 322 to the first focal area 356A, and subsequently, the control system 332 can control the optical assembly 322 to focus at the second focal area 356B, and the third focal area 356C.

It should be noted that in certain embodiments, the control system 332 can do an image analysis on the set of captured images 360A-360C to determine the relative depths of the one or more objects 316, 318, 320 in the scene 312. For example, the control system 332 can determine the relative depths (depth order) of the objects 316, 318, 320 in the scene 312 by performing an analysis on the variation of blurring (differences in intensities of pixels) in the set of captured images 360A-360C, evaluating spatial smoothness of a depth map for the set of captured images 360A-360C, and/or evaluating color information for the set of captured images 360A-360C.

Variation of blurring means the variance (or standard deviation) of a block of pixels centered at the pixel that is being evaluated. For example, to determine if a particular pixel is best focused in the first captured image 360A or in the second captured image 360B, the variance in intensity for the block of pixels in question is evaluated for each of the captured images 360A, 360B, 360C. Generally, if the scene is out of focus, adjacent pixels have very similar intensities. Alternatively, if the scene is in focus, adjacent pixels can have greater differences in intensities. Thus, the variance in intensity can be used to determine in which captured image a pixel is best focused.

In certain embodiments, the control system 332 performs an analysis on the captured images 360A-360C and determines that (i) the primary object 316 is best focused in the first captured image 360A, (ii) the foreground object 318 is best focused in the second captured image 360B, and (iii) the background object 320 is best focused in the third captured image 360C. Further, the control system 332 is able to determine the approximate values of the different focus distances 358A, 358B, 358C. With this information, the control system 332 can determine that the foreground object 318 is closest to the camera 310 and in the foreground, and the background object 320 is the farthest from the camera 310 and in the background. As a result thereof, the camera 310 can determine the relative depths of the objects 316, 318, 320 in the scene 312 and the camera 310 can extract the relative depths of the objects 316, 318, 320.

Figure 4A:
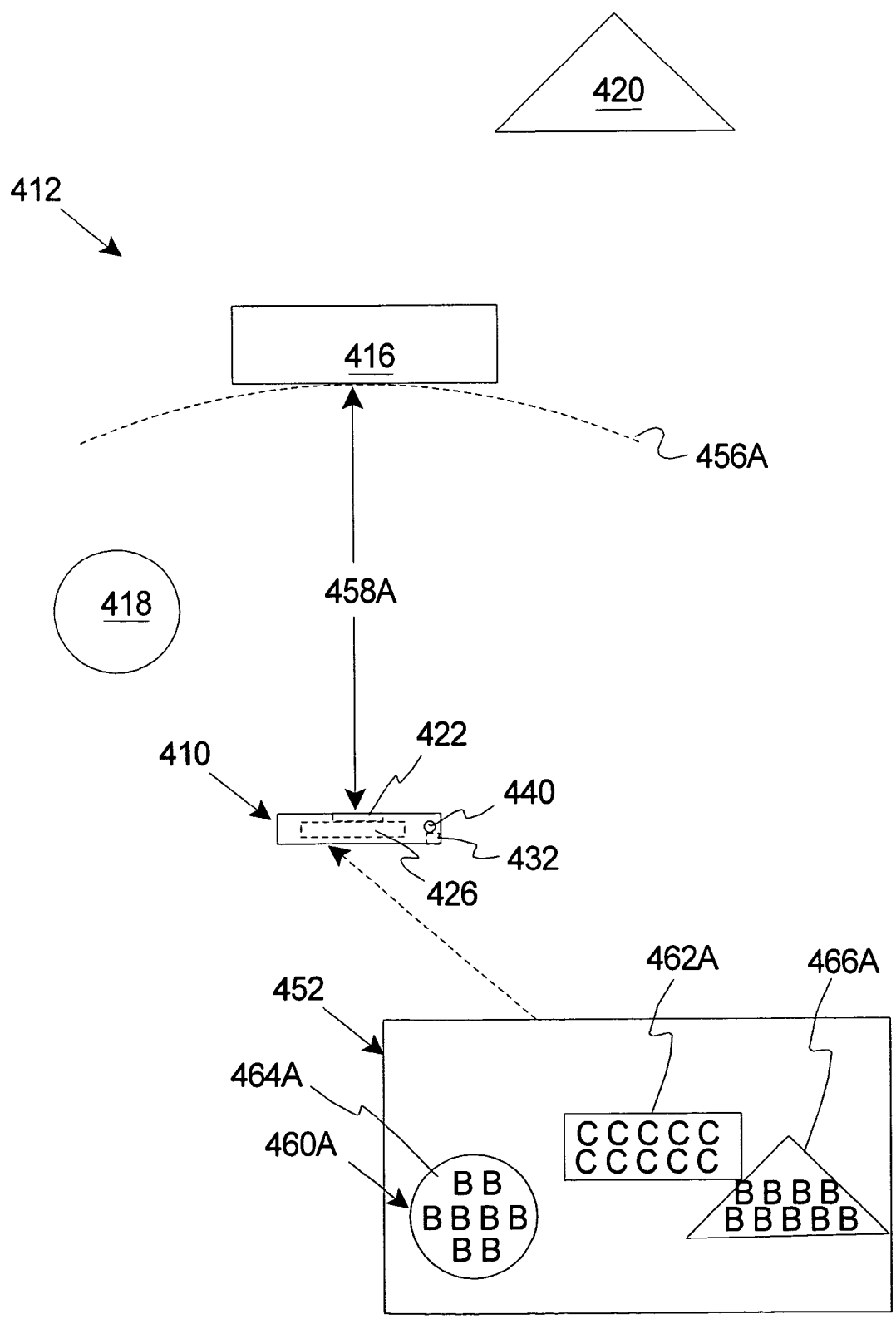
FIGS. 4A-4C illustrate the scene and the camera capturing three different captured images.
Figure 4B:
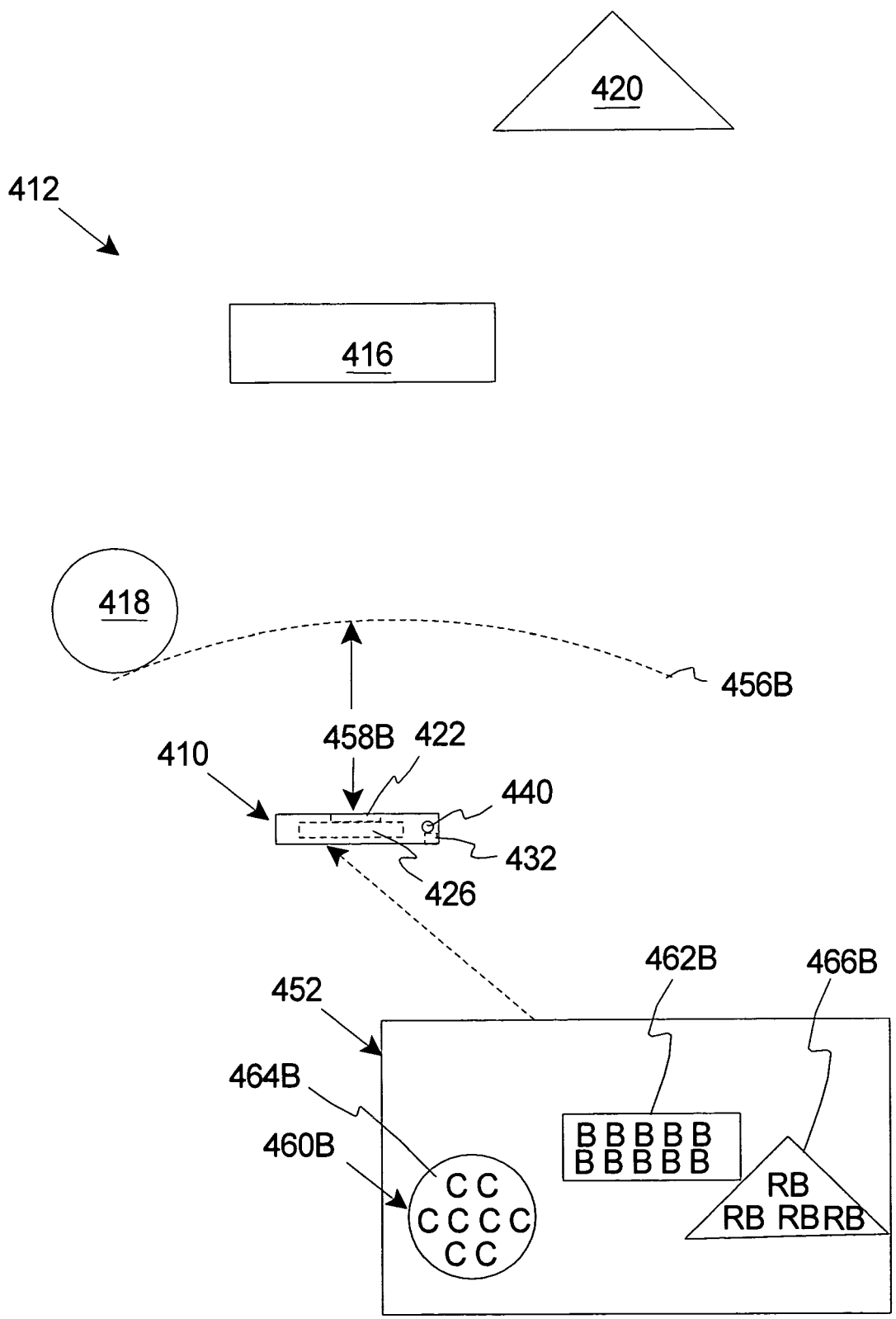
Figure 4C:
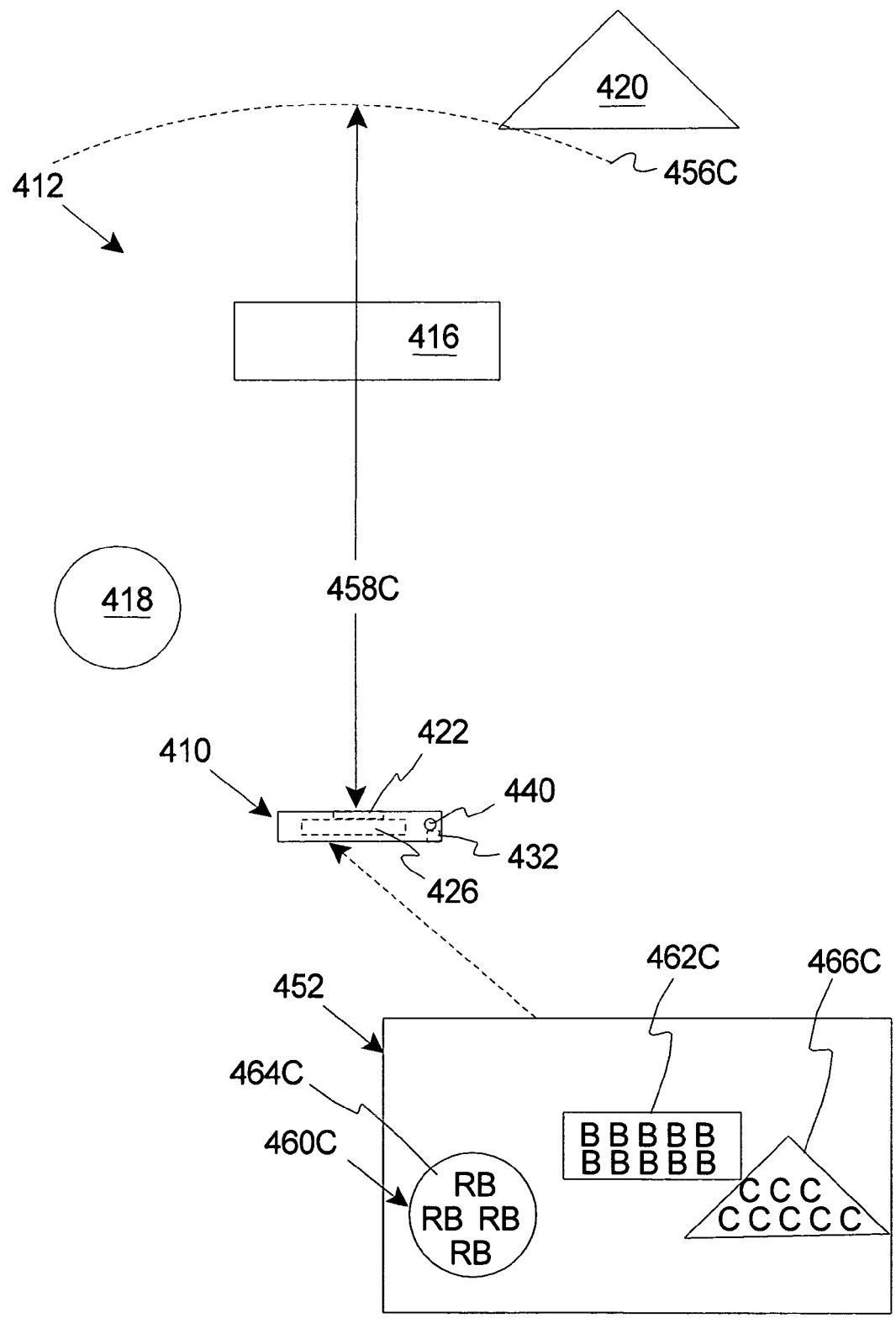

FIGS. 4A-4C illustrate the scene 412 including the primary first object 416, the foreground second object 418, and the background third object 420, the camera 410, and another set of captured images. FIGS. 4A-4C also illustrate the optical assembly 422, the capturing system 426, the control system 432, the shutter button 440 of the camera 410, and the image display 452.

In FIG. 4A, the optical assembly 422 is again focused at a first focal area 456A (illustrated as a dashed area) that is approximately at the front of the first object 416 and that is at a first focus distance 458A from the camera 410. FIG. 4A also illustrates a first captured image 460A that is captured while the optical assembly 422 is focused at the first focal area 456A. For the first captured image 460A, a captured primary object image 462A is clearly captured (represented as "C's"), a captured foreground object image 464A is blurred (represented as "B's"), and a captured background object image 466A is also blurred (represented as "B's").

In FIG. 4B, the optical assembly 422 is adjusted to be focused at a second focal area 456B that is approximately at the front of the second object 418 and that is at a second focus distance 458B from the camera 410. FIG. 4B also illustrates a second captured image 460B that is captured while the optical assembly 422 is focused at the second focal area 456B. For the second captured image 360B, a captured primary object image 462B is blurred (represented as "B's"), a captured foreground object image 464B is clear (represented as "C's"), and a captured background object image 466B is really blurred (represented as "RB's").

In FIG. 4C, the optical assembly 422 is adjusted to be focused on an third focal area 456C (illustrated as a dashed area) that is approximately at a front of the third object 420 and that is at a third focus distance 458C from the camera 410. FIG. 4C also illustrates a third captured image 460C that is captured while the optical assembly 422 is focused at the third focal area 456C. For the third captured image 460C, a captured primary object image 462C is blurred (represented as "B's"), a captured foreground object image 464C is really blurred (represented as "RB's"), and a captured background object image 466C is clear (represented as "C's").

The camera 410 can be designed to sequentially focus the optical assembly 422 on more than three or less than three focal areas 456A-456C, and sequentially capture more than three or less than three captured images 460A-460C.

Similar to the embodiment described above, the control system 432 can do an image analysis on the set of captured images 460A-460C to determine the relative depths of the one or more objects 416, 418, 420 in the scene 412.

FIGS. 5A-5D illustrate four alternative, non-exclusive examples of adjusted images 514A, 514B, 514C, 514D that were generated utilizing two or more of the captured images 360A-360C illustrated in FIGS. 3A-3C, or two or more of the captured images 460A-460C illustrated in FIGS. 4A-4C.

For example, one or more of the adjusted images 514A-514D can be generated by the control system 532 in the camera 510. Alternatively, one or more of the adjusted images 514A-514D can be generated by an adjustment system 680 (illustrated in FIG. 6). With this design, one set of captured images 360A-360C or 460A-460C can be used to guide the synthesis of the adjusted image 514A-514D. This analysis and combination can be accomplished with the control system 532 or outside the camera 510 with the adjustment system 680.

Figure 5A:
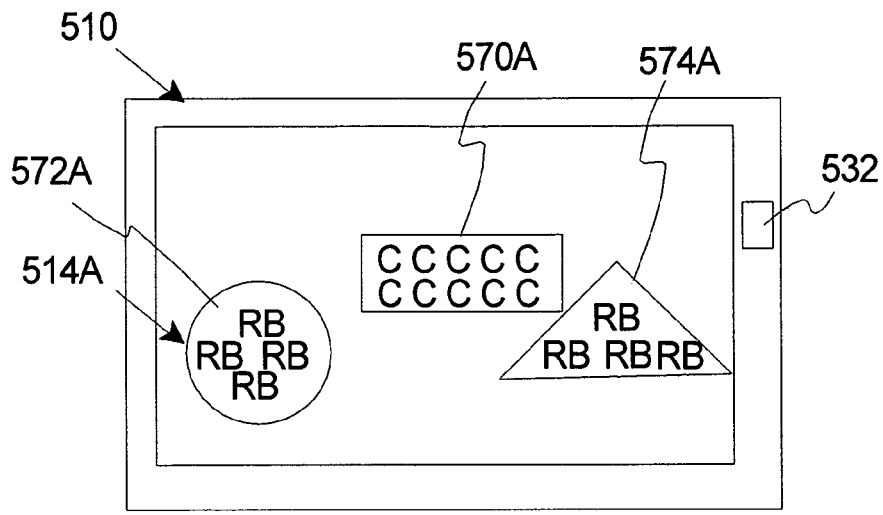
FIGS. 5A-5D illustrate four alternative adjusted images having features of the present invention.

One example of how the set of captured images 360A-360C can be used to guide the synthesis of an adjusted image 514A can be better understood with reference to FIGS. 3A-3C and 5A. In this embodiment, the control system 332 can evaluate the captured images 360A-360C and determine the depth order of the primary object 316, the foreground object 318, and the background object 320. After determining the depth order, during creation of the adjusted image 514A, the control system 332 can use the first captured image 360A with the primary object 316 in focus and can add some level of artificial blurring to one or more of the captured secondary object images, e.g. the captured foreground object image 364A, and the captured background object image 366A. As illustrated in FIG. 5A, the adjusted primary object image 570A is clear, the adjusted foreground object image 572A is really blurred, and the adjusted background object image 574A is also really blurred. As a result thereof, the primary object 316 is emphasized in the adjusted image 514A.

For example, the artificial blurring can be added to the secondary objects in the adjusted image 514A by passing the pixel information for the secondary objects. through a low pass filter to add the desired level of blurring to the secondary objects. Thus, the image of the primary object is processed different than the image of the secondary objects.

In FIG. 5A, blurring has been added to both the adjusted foreground object image 572A and the adjusted background object image 574A. Alternatively, blurring can be added to only one of these object images 572A, 574A.

Figure 5B:
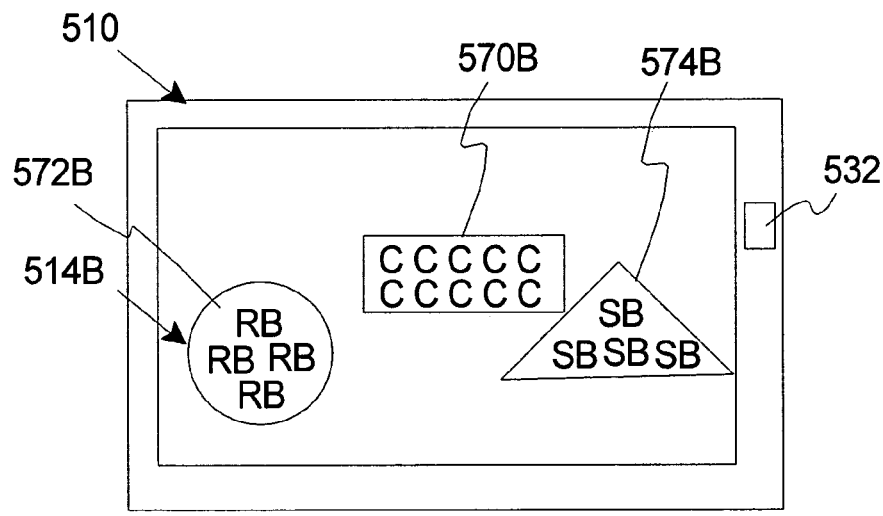

Another example of how the features of a set of captured images 360A-360C or 460A-460C can be utilized is illustrated in FIG. 5B. In this embodiment, the second adjusted image 514B can be generated utilizing the first and third captured images 360A, 360C (illustrated in FIGS. 3A, 3C). More specifically, the second adjusted image 514B includes (i) an adjusted primary object image 570B that is similar to the captured primary object image 362A from the first captured image 360A (illustrated in FIG. 3A), (ii) an adjusted foreground object image 572B that is similar to the captured foreground object image 364C from the third captured image 360C (illustrated in FIG. 3C), and (iii) an adjusted background object image 574B that is similar to the captured background object image 366C from the third captured image 360C (illustrated in FIG. 3C). With this design, for the second adjusted image 514B, the adjusted primary object image 570B is clear, the adjusted foreground object image 572B is really blurred, and the adjusted background object image 574B is slightly blurred.

In this embodiment, mask information for each of the individual objects may have to be computed prior to combining the object images into the adjusted image.

Figure 5C:
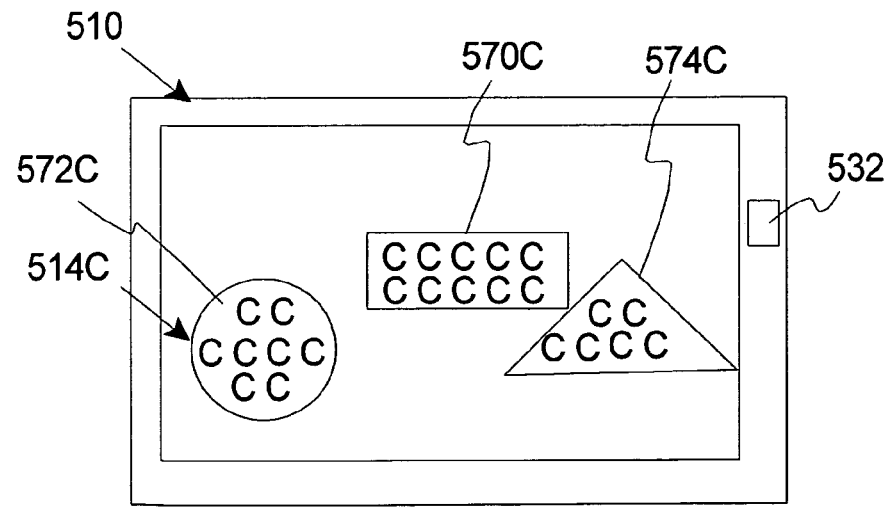

Yet another example of how the features of a set of captured images 360A-360C or 460A-460C can be combined is illustrated in FIG. 5C. In this embodiment, the third adjusted image 514C can be generated utilizing the first, second, and third captured images 460A, 460B, 460C (illustrated in FIGS. 4A-4C). More specifically, the third adjusted image 514C includes (i) an adjusted primary object image 570C that is similar to the captured primary object image 462A from the first captured image 460A (illustrated in FIG. 4A), (ii) an adjusted foreground object image 572C that is similar to the captured foreground object image 464B from the second captured image 460C (illustrated in FIG. 4B), and (iii) an adjusted background object image 574C that is similar to the captured background object image 466C from the third captured image 460C (illustrated in FIG. 4C). With this design, for the third adjusted image 514C, the adjusted primary object image 570C is clear, the adjusted foreground object image 572C is clear, and the adjusted background object image 574C is clear.

Figure 5D:
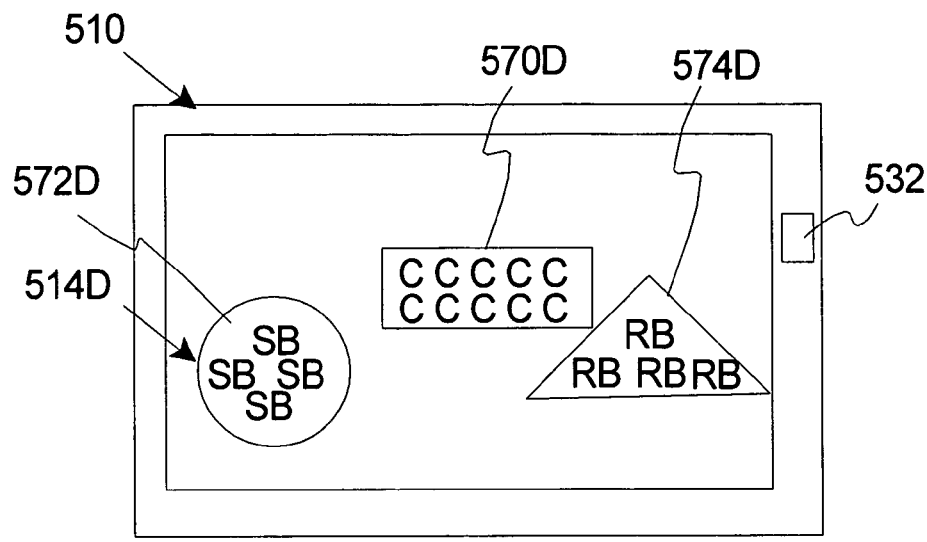

Yet another example of how the features of a set of captured images 360A-360C or 460A-460C can be combined is illustrated in FIG. 5D. In this embodiment, the fourth adjusted image 514D can be generated utilizing the first and second captured images 360A, 360B (illustrated in FIGS. 3A, 3B). More specifically, the fourth adjusted image 514D includes (i) an adjusted primary object image 570D that is similar to the captured primary object image 362A from the first captured image 360A (illustrated in FIG. 3A), (ii) an adjusted foreground object image 572D that is similar to the captured foreground object image 364B from the second captured image 360B (illustrated in FIG. 3B), and (iii) an adjusted background object image 574D that is similar to the captured background object image 366B from the second captured image 360B (illustrated in FIG. 3B). With this design, for the fourth adjusted image 514D, the adjusted primary object image 570D is clear, the adjusted foreground object image 572D is slightly blurred, and the adjusted background object image 574D is really blurred.

It should be noted that each set of captured images 360A-360C or 460A-460C can be utilized in other fashions.

Figure 6:
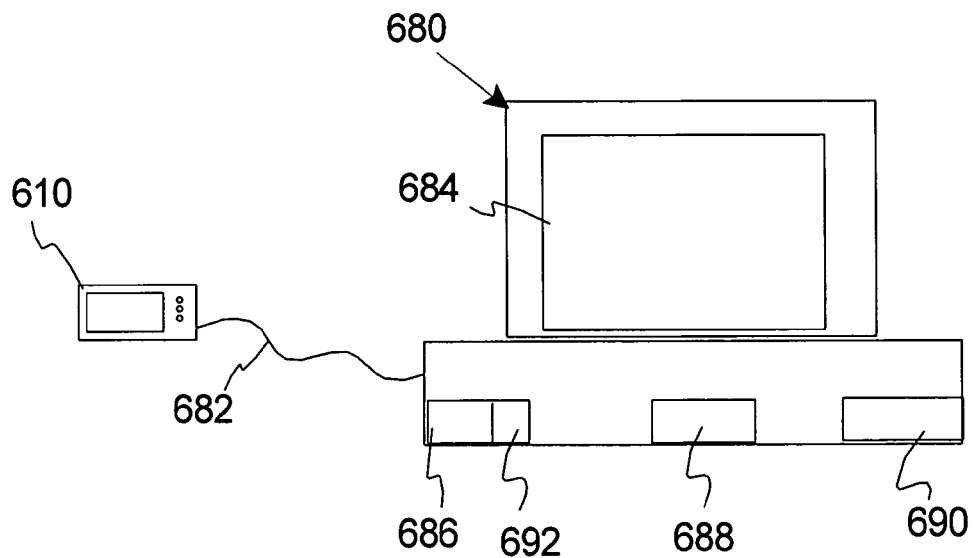
FIG. 6 is a simplified illustration of a combination having features of the present invention.

FIG. 6 is a simplified illustration of a combination having features of the present invention, including a camera 610, and a post-processing adjustment system 680. In this embodiment, the camera 610 captures the sets of multiple captured images (not shown in FIG. 6) and the adjustment system 680 can be used to provide the related adjusted image (not shown in FIG. 6) from the multiple captured images.

In FIG. 6, an electrical connection line 682 can connect the camera 610 to the adjustment system 680 to allow for the transfer of the sets of multiple captured images to the adjustment system 680. Alternatively, the multiple captured images can be transferred to the adjustment system 680 in another fashion. For example, the camera 610 can include a removable storage system (not shown in FIG. 6) that is selectively removed from the camera 610 and inserted into a docking port (not shown) of the adjustment system 680. Further, the camera 610 can be connected in a wireless fashion to the adjustment system 680.

The design of the adjustment system 680 can be varied. In FIG. 6, the adjustment system 680 is a personal computer that includes a system display 684, a system storage device 686, a system processor 688, a system input device 690, and adjustment software 692. For example, (i) the system display 684 can be a monitor, (ii) the system storage device 686 can include one or more magnetic disk drives, magnetic tape drives, optical storage units, CD-ROM drives and/or flash memory, (iii) the system processor 688 can include one or more conventional CPU's, and (iv) the system input device 690 can include a keyboard, or a mouse.

In FIG. 6, the system display 684 can display the adjusted image and/or the sets of multiple captured images. The user can use the system input device 690 to control the adjusted image, select one or more portions from the captured images to provide the adjusted image.

The adjustment software 692 includes one or more algorithms that utilize the multiple captured images and the corresponding focus distances to provide image depth analysis and to guide the synthesis of the adjusted image from the multiple captured images. The adjustment software 692 can function in a similar fashion as the control system (not shown in FIG. 6) described above.

Figure 7:
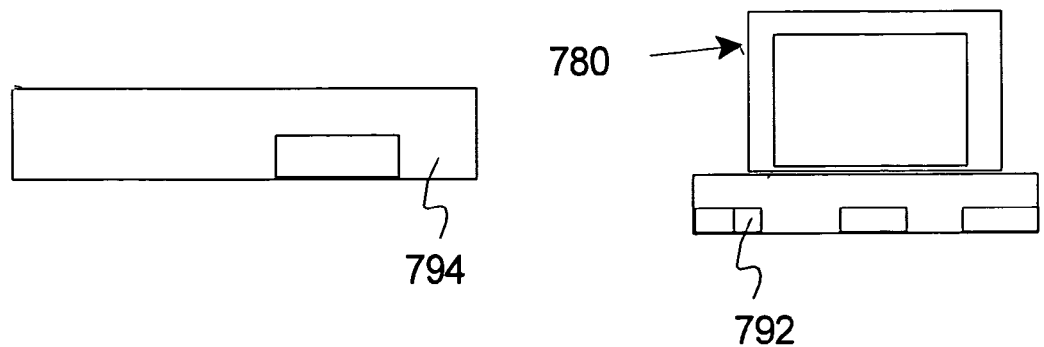
FIG. 7 is a simplified illustration of another embodiment of a combination having features of the present invention.

FIG. 7 is a simplified illustration of yet another embodiment of an adjustment system 780 having features of the present invention. In this embodiment, the adjustment system 780 is again a computer system that contains the adjustment software 792. However, in this embodiment, the adjustment system 780 is remotely accessed by a personal computer 794 over the internet. With this design, the sets of multiple captured images can be transferred to the adjustment system 780. Subsequently, the adjustment system 780 can provide the adjusted image.

Figure 8A:
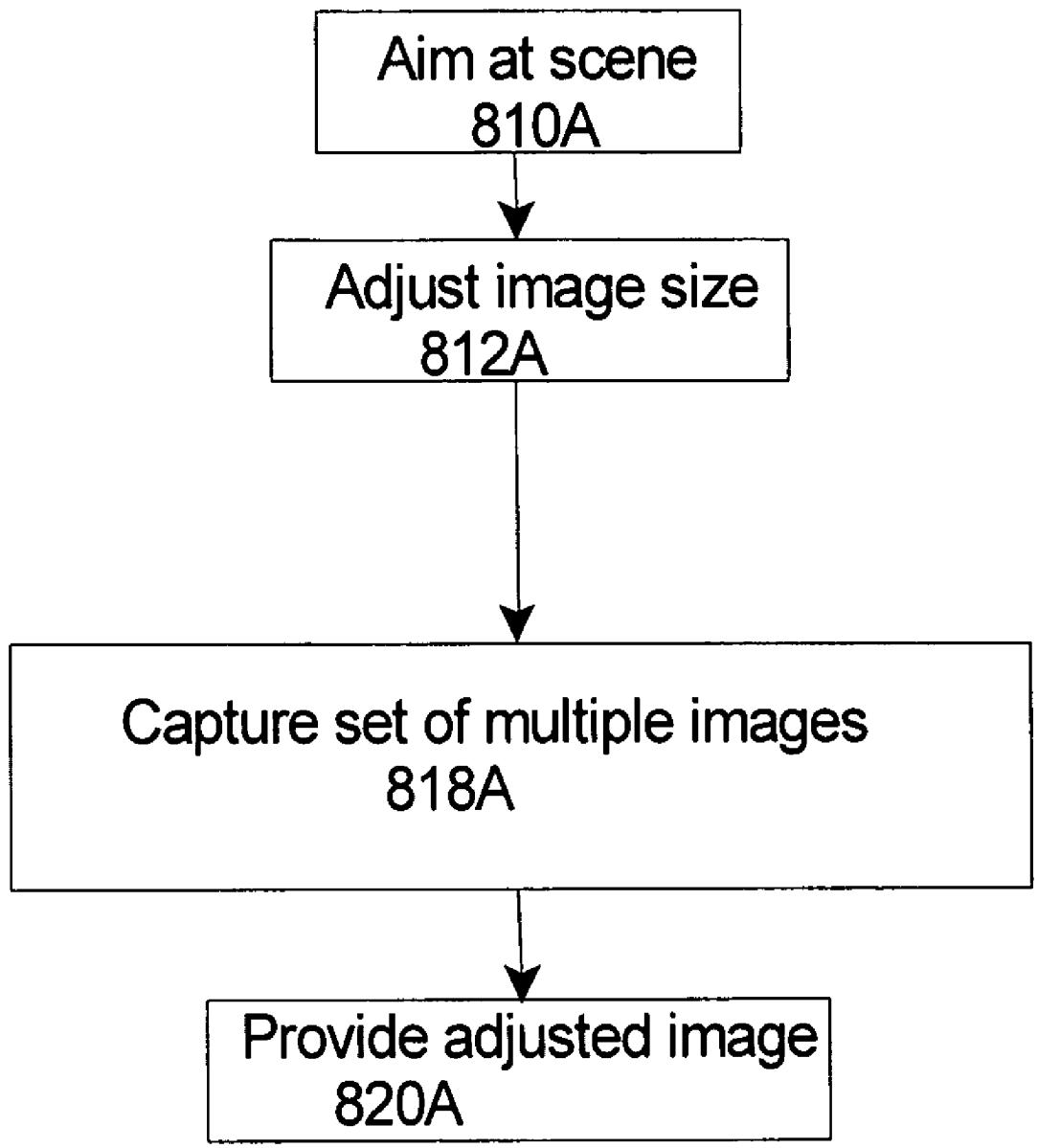
FIG. 8A is a simplified flowchart that illustrates one example of the operation of the present invention.

FIG. 8A is a simplified flowchart that illustrates one non-exclusive example of the operation of the present invention. First, the camera is aimed toward the scene 810A. Second, the user adjusts the zoom so as to adjust the size of the image as desired 812A. Next, the camera captures a set of multiple captured images at different focus distances in rapid succession 818A. Subsequently, the control system performs depth layer extraction and provides the adjusted image from the set of multiple captured images 820A.

Figure 8B:
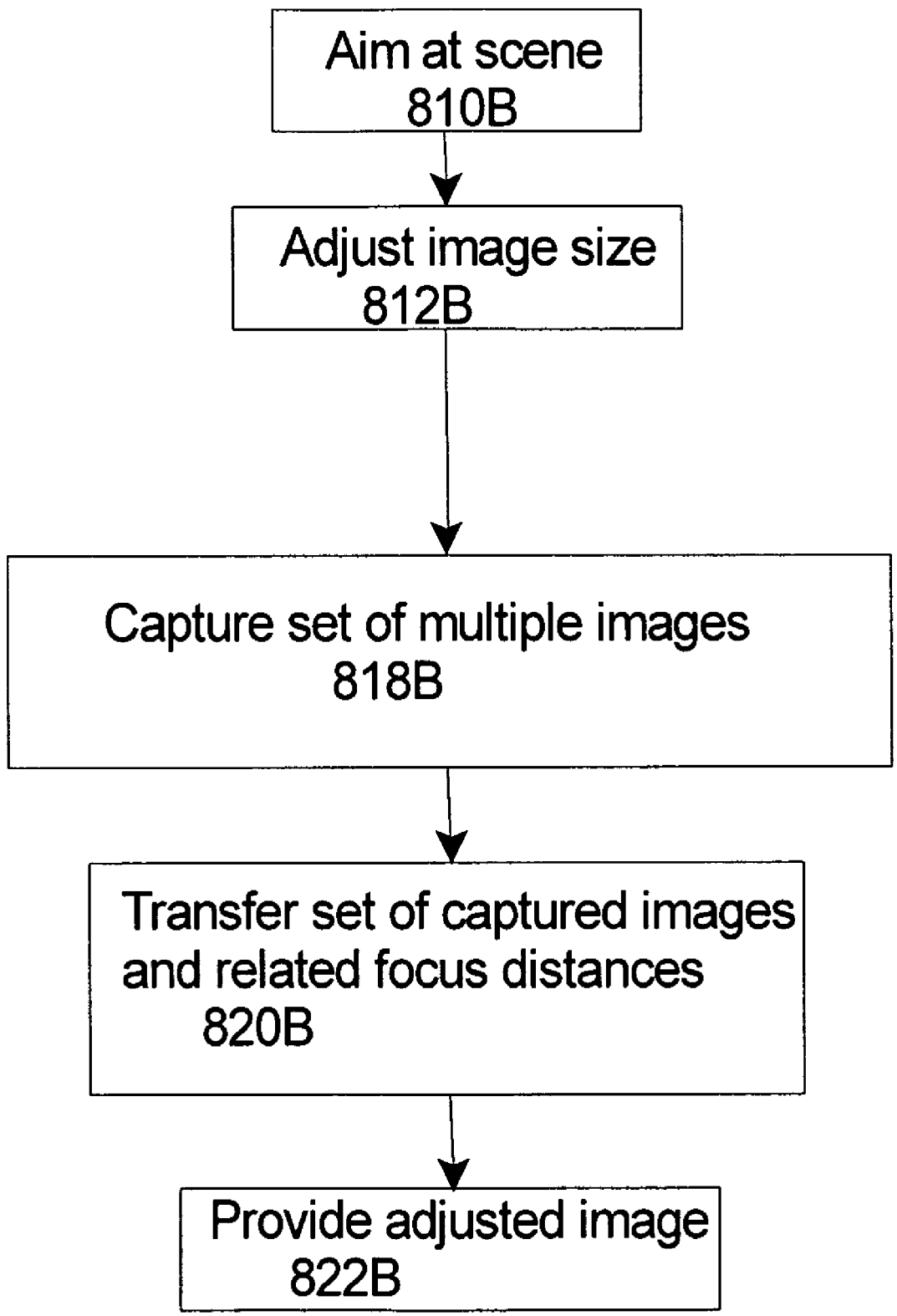
FIG. 8B is a simplified flowchart that illustrates another example of the operation of the present invention.

FIG. 8B is a simplified flowchart that illustrates another non-exclusive example of the operation of the present invention. First, the camera is aimed toward the scene 810B. Second, the user adjusts the zoom so as to adjust the size of the image as desired 812B. Next, the camera captures a set of multiple captured images at different focus distances in rapid succession 818B. Subsequently, the set of multiple captured images and the corresponding focus distances are transferred to an adjustment system for post-processing 820B. Finally, the adjustment system performs depth layer extraction and provides the adjusted image from the set of multiple captured images 822B.

While the current invention is disclosed in detail herein, it is to be understood that it is merely illustrative of the presently preferred embodiments of the invention and that no limitations are intended to the details of construction or design herein shown other than as described in the appended claims.

What is claimed is:

1. A camera for providing an adjusted image of a scene, the camera comprising:
   an optical assembly that is adjustable to alternatively be focused on a first focal area and a second focal area that is different than the first focal area;
   a capturing system coupled to the optical assembly, the capturing system capturing a first captured image when the optical assembly is focused at the first focal area and capturing a second captured image when the optical assembly is focused at the second focal area; and a control system coupled to the optical assembly, the control system providing the adjusted image of the scene based upon the first captured image and the second captured image, the control system adding artificial blurring to at least a portion of the adjusted image.

2. The camera of claim 1 wherein the scene includes a primary object and a secondary object and the control system evaluates the captured images to determine a depth order of the objects relative to the camera.

3. The camera of claim 1 wherein the optical assembly is adjustable to focus at a third focal area that is different than the first focal area and the second focal area, and wherein the control system provides the adjusted image of the scene based upon the first captured image, the second captured image, and the third captured image.

4. The camera of claim 3 wherein the scene includes a primary object and a secondary object and the control system evaluates the captured images to determine a depth order of the objects relative to the camera.

5. The camera of claim 4 wherein the control system determines the depth order of the objects by comparing a variation in blurring of the primary object in the captured images and by comparing a variation in blurring of the secondary object in the captured images.

6. The camera of claim 4 wherein the control system determines the depth order by evaluating color information of the primary object in the captured images and by comparing color information of the secondary object in the captured images.

7. The camera of claim 4 wherein the control system provides the adjusted image of the scene based on the first captured image with processing of the primary object different than processing of the secondary object.

8. The camera of claim 1 wherein the adjusted image includes the image of the primary object from the first captured image and the image of the secondary object from the second captured image.

9. The camera of claim 1 wherein the capturing system captures the captured images in relatively rapid succession.

10. A camera for providing an adjusted image of a scene that includes a first object and a second object, the camera comprising:

an optical assembly being adjustable to alternatively be focused on a first focal area and a second focal area that is different than the first focal area;

a capturing system coupled to the optical assembly, the capturing system capturing a first captured image when the optical assembly is focused at the first focal area and capturing a second captured image when the optical assembly is focused at the second focal area; and a control system that evaluates the captured images to determine a depth order of the objects relative to the camera, the control system providing the adjusted image of the scene based on the depth order of the objects relative to the camera.

11. The camera of claim 10 wherein the control system determines the depth order of the objects by comparing a variation in blurring of the first object in the captured images and by comparing a variation in blurring of the second object in the captured images.

12. The camera of claim 10 wherein the control system determines the depth order by evaluating color information of the first object in the captured images and by comparing color information of the second object in the captured images.

13. The camera of claim 10 wherein the control system provides the adjusted image of the scene based on the first captured image with processing of the first object different than processing of the second object.

14. The camera of claim 10 wherein the control system provides the adjusted image of the scene that includes the image of the first object from the first captured image and the image of the second object from the second captured image.

15. The camera of claim 10 wherein the optical assembly is adjustable to focus at a third focal area that is different than the first focal area and the second focal area, and wherein the control system evaluates the three captured images to determine a depth order of the objects relative to the camera.

16. The camera of claim 15 wherein the control system determines the depth order of the objects by comparing a variation in blurring of the first object in the captured images and by comparing a variation in blurring of the second object in the captured images.

17. The camera of claim 15 wherein the control system determines the depth order by evaluating color information of the primary object in the captured images and by comparing color information of the secondary object in the captured images.

18. A combination for providing an adjusted image of a scene that includes a first object and a second object, the combination comprising:

a camera comprising (i) an optical assembly that is adjustable to alternatively be focused on a first focal area and a second focal area that is different than the first focal area; and (ii) a capturing system secured to the optical assembly, the capturing system capturing a first captured image when the optical assembly is focused at the first focal area and capturing a second captured image when the optical assembly is focused at the second focal area, the capturing system capturing the captured images in relatively rapid succession; and an adjustment system that receives the first captured image and the second captured image, the adjustment system evaluating the captured images to determine a depth order of the objects relative to the camera, the adjustment system providing the adjusted image of the scene based on the depth order of the objects relative to the camera.

19. The combination of claim 18 wherein the optical assembly is adjustable to focus at a third focal area that is different than the first focal area and the second focal area, and wherein the adjustment system evaluates the three captured images to determine the depth order of the objects relative to the camera.

20. The combination of claim 18 wherein the adjustment system determines the depth order of the objects by comparing a variation in blurring of the first object in the captured images and by comparing a variation in blurring of the second object in the captured images.

21. The combination of claim 18 wherein the adjustment system determines the depth order by evaluating color information of the first object in the captured images and by comparing color information of the second object in the captured images.

22. The combination of claim 18 wherein the adjustment system provides the adjusted image of the scene based on the first captured image with processing of the first object different than processing of the second object.

23. A method for providing an adjusted image of a scene that includes a first object and a second object that is spaced apart from the first object, the method comprising the steps of:

adjusting an optical assembly to focus on a first focal area;

capturing a first captured image when the optical assembly is focused at the first focal area with a capturing system;

adjusting the optical assembly to focus on a second focal area that is different than the first focal area;

capturing a second captured image when the optical assembly is focused at the second focal area with the capturing system;

evaluating the captured images to determine a depth order of the objects in the captured images;

providing the adjusted image of the scene based on the first captured image and the second captured image; and adding artificial blurring to at least a portion of the adjusted image.

24. The method of claim 23 further comprising the steps of adjusting the optical assembly to focus on a third focal area that is different than the first and second focal areas, and capturing a third captured image when the optical assembly is focused at the third focal area with the capturing system; and wherein the step of evaluating includes evaluating the three captured images to determine the depth order of the objects in the captured images.

25. The method of claim 24 wherein the step of evaluating includes the step of comparing a variation in blurring of the first object in the captured images and by comparing a variation in blurring of the second object in the captured images.

26. The method of claim 24 wherein the step of evaluating includes the step of evaluating color information of the first object in the captured images and by comparing color information of the second object in the captured images.

27. The method of claim 23 wherein the step of providing includes the step of providing the adjusted image of the scene based on the first captured image with processing of the first object different than processing of the second object.

* * * * *